US007847559B2

(12) United States Patent
Knott

(10) Patent No.: US 7,847,559 B2
(45) Date of Patent: *Dec. 7, 2010

(54) METHOD AND APPARATUS FOR SHIELDING FEEDTHROUGH PIN INSULATORS IN AN IONIZATION GAUGE OPERATING IN HARSH ENVIRONMENTS

(75) Inventor: Richard A. Knott, Broomfield, CO (US)

(73) Assignee: Brooks Automation, Inc., Chelmsford, MA (US)

( * ) Notice: Subject to any disclaimer, the term of this patent is extended or adjusted under 35 U.S.C. 154(b) by 129 days.

This patent is subject to a terminal disclaimer.

(21) Appl. No.: 12/313,778

(22) Filed: Nov. 24, 2008

(65) Prior Publication Data

US 2009/0146665 A1 Jun. 11, 2009

Related U.S. Application Data

(62) Division of application No. 11/588,109, filed on Oct. 26, 2006, now Pat. No. 7,456,634.

(51) Int. Cl.
*G01L 21/30* (2006.01)
*H01J 1/53* (2006.01)

(52) U.S. Cl. ...................................... 324/460; 313/240

(58) Field of Classification Search ................. 324/460, 324/459, 462, 463, 464, 468, 470; 313/37, 313/38, 230, 293, 310, 364, 632; 417/48, 417/49, 63
See application file for complete search history.

(56) References Cited

U.S. PATENT DOCUMENTS 3,239,133 A 3/1966 Noller (Continued)

FOREIGN PATENT DOCUMENTS

WO WO 2008/051603 5/2008

OTHER PUBLICATIONS

Notification Concerning Transmittal of International Preliminary Report on Patentability for International Application No. PCT/US2007/022663, mailed on May 7, 2009.

(Continued)

*Primary Examiner*—Hoai-An D Nguyen
(74) *Attorney, Agent, or Firm*—Hamilton, Brook, Smith & Reynolds, P.C.

(57) ABSTRACT

Shields for feedthrough pin insulators of a hot cathode ionization gauge are provided to increase the operational lifetime of the ionization gauge in harmful process environments. Various shield materials, designs, and configurations may be employed depending on the gauge design and other factors. In one embodiment, the shields may include apertures through which to insert feedthrough pins and spacers to provide an optimal distance between the shields and the feedthrough pin insulators before the shields are attached to the gauge. The shields may further include tabs used to attach the shields to components of the gauge, such as the gauge's feedthrough pins. Through use of example embodiments of the insulator shields, the life of the ionization gauge is extended by preventing gaseous products from a process in a vacuum chamber or material sputtered from the ionization gauge from depositing on the feedthrough pin insulators and causing electrical leakage from the gauge's electrodes.

12 Claims, 5 Drawing Sheets

U.S. PATENT DOCUMENTS

| | | | | |
|---|---|---|---|---|
| 3,307,774 | A | | 3/1967 | Bannock et al. |
| 3,371,853 | A | | 3/1968 | Maliakal |
| 4,013,913 | A | | 3/1977 | Driscoll et al. |
| 4,304,997 | A | * | 12/1981 | Sullivan et al. ............ 250/379 |
| 4,460,317 | A | | 7/1984 | Kern et al. |
| 5,296,817 | A | | 3/1994 | Bills et al. |
| 5,422,573 | A | | 6/1995 | Bills et al. |
| 5,476,001 | A | * | 12/1995 | Hoetzel et al. ............ 73/23.31 |
| 5,602,441 | A | | 2/1997 | Ohsako et al. |
| 5,973,906 | A | | 10/1999 | Stevenson et al. |
| 6,239,429 | B1 | | 5/2001 | Blessing et al. |
| 6,305,975 | B1 | | 10/2001 | Steiner |
| 6,313,638 | B1 | | 11/2001 | Sun et al. |
| 6,515,482 | B2 | | 2/2003 | Kawasaki |
| 6,661,826 | B2 | | 12/2003 | Ujazdowski et al. |
| 7,035,077 | B2 | | 4/2006 | Brendel |
| 7,129,708 | B1 | | 10/2006 | Liu et al. |
| 7,352,187 | B2 | | 4/2008 | Knapp et al. |
| 7,456,634 | B2 | | 11/2008 | Knott |
| 2007/0179554 | A1 | | 8/2007 | Iyer et al. |
| 2008/0100301 | A1 | | 5/2008 | Knott |

OTHER PUBLICATIONS

Groβe-Bley, Werner, "A Hot Cathode Ionization Gauge Transmitter for Industrial Vacuum Measurement," *Vacuum* 51(1):31-37 (1998).

Arnold, P.C., et al., "Development, Design and Calibration Methods for an Improved Hot Cathode Ionization Gauge for Vacuum Measurements," NCSL International Workshop & Symposium, pp. 1-13 (2004).

Arnold, P.C., et al., "Stable and Reproducible Bayard-Alpert Ionization Gauge," J. Vac. Sci. Technol. A, vol. 12, No. 2, pp. 580-586 (Mar./Apr. 1994).

Feb. 18, 2009, Notification of Transmittal of the International Search Report and the Written Opinion of the International Searching Authority, or the Declaration, PCT/US2007/022663.

* cited by examiner

METHOD AND APPARATUS FOR SHIELDING FEEDTHROUGH PIN INSULATORS IN AN IONIZATION GAUGE OPERATING IN HARSH ENVIRONMENTS

RELATED APPLICATION(S)

This application is a divisional of U.S. application Ser. No. 11/588,109, filed Oct. 26, 2006 now U.S. Pat. No. 7,456,634. The entire teachings of the above application(s) are incorporated herein by reference.

BACKGROUND OF THE INVENTION

The most common hot-cathode ionization gauge is the Bayard-Alpert (B-A) gauge. The B-A gauge includes at least one heated cathode (or filament) that emits electrons toward an anode, such as a cylindrical wire grid, defining an anode volume (or ionization volume). At least one ion collector electrode may be disposed within the anode volume. The anode accelerates the electrons away from the cathode towards and through the anode. Eventually, the anode collects the electrons.

In their travel, the electrons impact gas molecules and atoms and create positive ions. The positive ions are then urged to the ion collector electrode by an electric field created in the anode volume by the anode and the ion collector electrode. The electric field may be created by applying a positive voltage to the anode and maintaining the ion collector electrode at ground potential. A collector current is generated in the ion collector electrode as ionized atoms collect on the ion collector electrode. The pressure of the gas within the anode volume can be calculated from ion current ($I_{ion}$) generated in the ion collector electrode and electron current ($I_{electron}$) generated in the anode by the formula $P=(1/S)(I_{ion}/I_{electron})$, where S is a scaling coefficient (also known as gauge sensitivity) with units of 1/Torr (or any other units of pressure, such as 1/Pascal) that characterizes gas type and a particular gauge's geometry and electrical parameters.

The operational lifetime of a typical B-A ionization gauge is approximately ten years when the gauge is operated in benign environments. However, these same gauges fail in hours or even minutes when operated in harmful environments of certain vacuum processes that involve, for example, high pressures or certain gas types.

SUMMARY OF THE INVENTION

Embodiments of an ionization gauge are provided that increase the overall operational lifetime of a hot-cathode ionization gauge. An example embodiment includes at least one electrode, an electrical feedthrough pin that connects to the at least one electrode, an insulator that connects to and surrounds the electrical feedthrough pin, and a shield associated with the electrical feedthrough pin. The shield is configured to shield the insulator from material that may deposit on the insulator and cause electrical leakage between the electrical feedthrough pin and nearby gauge components. The material may include material from a vacuum process or material sputtered from surfaces of the ionization gauge. As a result, embodiments of the shield increase the overall operational lifetime of an ionization gauge.

In one embodiment, the at least one electrode includes at least one of each of a cathode, an anode that defines an anode volume, and an ion collector electrode. Individual feedthrough pins may respectively connect to each cathode, anode, and ion collector electrode. Individual shields may be associated with respective individual electrical feedthrough pins. The shields may include spacers configured to provide an optical distance between the shields and the insulators so as to effectively shield the insulators from harmful materials. In some embodiments, the at least one ion collector electrode may be disposed inside of the anode volume and the at least one cathode may be disposed outside of the anode volume.

An example ionization gauge may further include a feedthrough plate through which feedthrough pins may pass and feedthrough pin insulators that electrically isolate the electrical feedthrough pins from the feedthrough plate. The example ionization gauge may further include an enclosure connected to the feedthrough plate. The shields may attach to the feedthrough plate or to the enclosure. The shields may be made of an insulating material, such as a ceramic or glass material, or a conducting material, such as a metallic material.

An embodiment of a feedthrough pin insulator shield includes a shielding object with an aperture adapted to receive a feedthrough pin of an ionization gauge electrode. The feedthrough pin insulator shield may further include: (1) a spacer protruding from the shielding object adapted to provide a distance between the shielding object and a feedthrough pin insulator and (2) a tab protruding from the shielding object adapted to be attached to the feedthrough pin.

An example method of manufacturing a portion of an ionization gauge (e.g., a feedthrough pin assembly) with feedthrough pin insulator shields is also provided. The example method includes inserting a feedthrough pin through an aperture in a feedthrough pin insulator shield. The shield is moved along the feedthrough pin until a spacer, protruding from the shield, contacts a feedthrough pin insulator surrounding the feedthrough pin. The shield may then be attached to the feedthrough pin, the feedthrough pin insulator, or an envelope of the ionization gauge. The shield may include a tab protruding from the shield that may be attached to the feedthrough pin, the feedthrough insulator, or the envelope of the ionization gauge. In one embodiment, the tab may be welded to the feedthrough pin.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
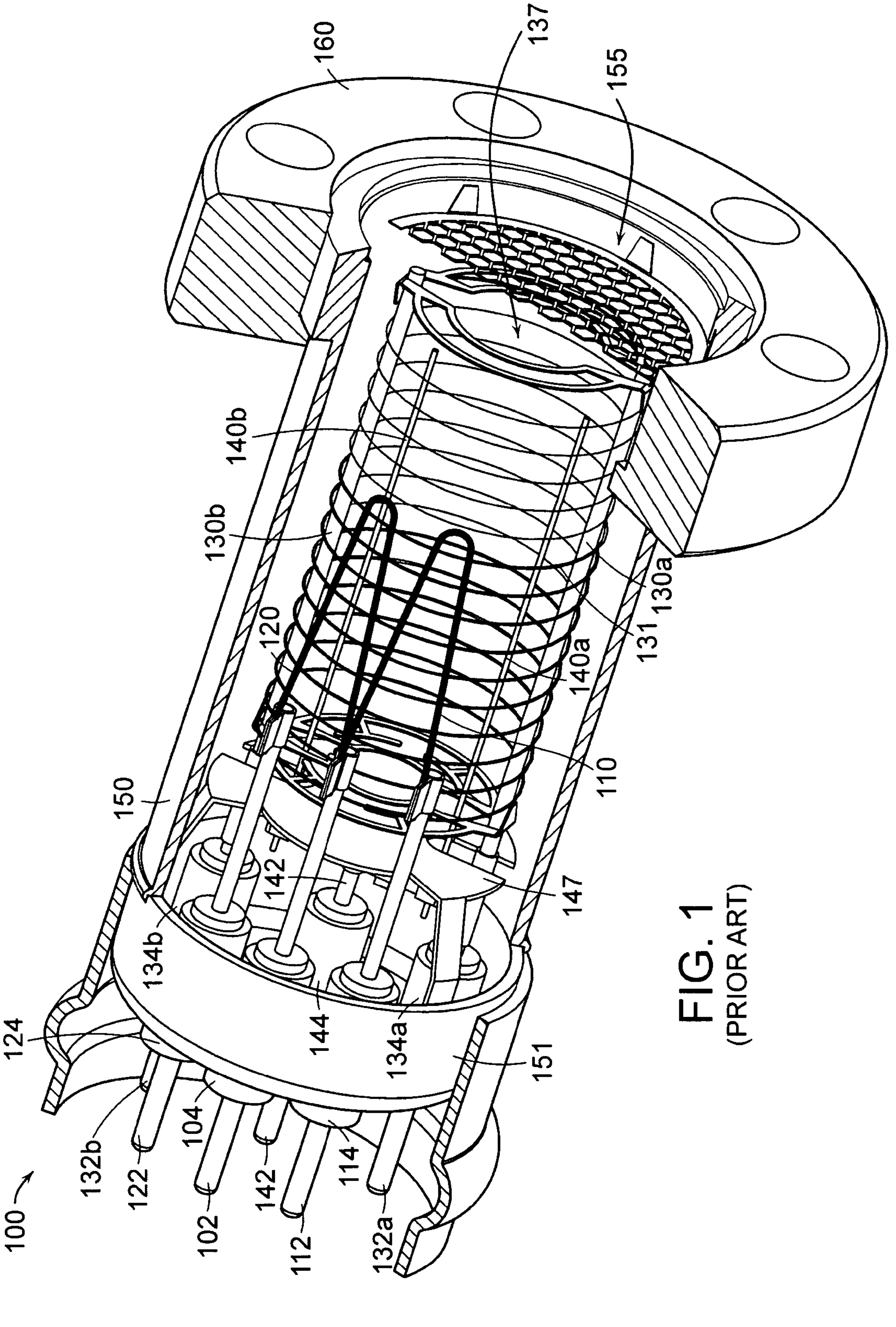
FIG. 1 (PRIOR ART)
FIG. 1 is a perspective view of an example hot-cathode ionization gauge according to the prior art.

FIG. 1 is a perspective view of an example hot-cathode ionization gauge 100 according to the prior art, illustrating feedthrough pin insulators that benefit from embodiments of a feedthrough pin insulator shield. The hot-cathode ionization gauge 100 includes a cylindrical wire grid 131 (i.e., anode) defining an ionization volume 137 (i.e., anode volume). Two ion collector electrodes 140*a*, 140*b* are disposed within the ionization volume 137 and two cathodes 110, 120 are disposed external from the cylindrical wire grid 131. The ion collector electrodes 140*a*, 140*b* are joined at one of their ends by a supporting structure 348 illustrated in FIG. 3A. The supporting structure 348, in turn, is mounted to a feedthrough pin 142.

The hot-cathode ionization gauge 100 also includes a collector shield 147, such as a stainless steel shield, to shield various components of the ionization gauge from ionized process gas molecules and atoms and other effects of charged particles. Additionally, the collector shield 147 blocks the path of x-ray photons generated when the electrons emitted by the cathodes 110, 120 impact the grid. Otherwise, the x-ray photons are intercepted by all gauge surfaces in a line-of-sight from the grid surfaces, including the ion collector electrodes 140*a*, 140*b* and the ion collector supporting structure 348.

When the x-ray photons strike the ion collector supporting structure 348 (see FIG. 3A) as well as the ion collector electrodes 140*a-b* themselves, electrons are photoelectrically ejected from the ion collector electrodes 140*a-b* and from the ion collector supporting structure 348. As a result, a photoelectron current is generated in the ion collector electrodes 140*a-b* and in the ion collector supporting structure 348. The photoelectron current adds to the correct ion current to produce a spurious ion collector current that is measured as if it were from ions. In other words, the photoelectron current appears the same as positive ions arriving at the ion collector electrodes 140*a-b*. In this manner, the x-ray photons limit the pressure range that can be measured. In a standard B-A gauge design, the ion collector electrodes 140*a-b*, which are minimized in size, are accessible to both the ions created inside the grid volume and the x-ray photons. Thus, a collector shield 147 is used to shield the large surfaces of the supporting structure 348 of the ion collector electrodes 140*a-b* from the x-ray photons.

The above elements of the hot-cathode ionization gauge 100 are enclosed within a tube or envelope 150 that opens into a process chamber via port 155. The gauge 100 includes a flange 160 to attach the gauge 100 to a vacuum system.

A first end of the first cathode 110 and a first end of the second cathode 120 connect, via feedthrough pins 112 and 122, respectively, to gauge electronics (not shown) which supply power to heat the first and second cathodes 110, 120. A second end of both cathodes 110, 120 connect, via feedthrough pin 102, to the gauge electronics which provide a bias voltage to the second end of both cathodes 110, 120. The cylindrical wire grid 131 connects, via grid supports 130*a*, 130*b* and corresponding feedthrough pins 132*a*, 132*b*, to the gauge electronics which maintains the cylindrical wire grid 131 at a positive voltage, such as 180 volts, and measures the electron current generated in the cylindrical wire grid 131. Lastly, the ion collector electrodes 140*a*, 140*b* connect, via the ion collector supporting structure 348 and the feedthrough pin 142, to the gauge electronics which measure the total collector current generated in the ion collector electrodes 140*a*, 140*b*.

The feedthrough pins 102, 112, 122, 132*a-b*, 142 pass through the feedthrough plate 151 and connect to appropriate electrodes 110, 120, 130*a-b*, 140*a-b*. The feedthrough pins 102, 112, 122, 132*a-b*, 142 include respective insulators 104, 114, 124, 134*a-b*, 144 that electrically isolate the feedthrough pins 102, 112, 122, 132*a-b*, 142 from the feedthrough plate 151 and from each other. The insulators 104, 114, 124, 134*a-b*, 144 may be made of a ceramic material, such as aluminum oxide, or a glass material. The feedthrough assembly (i.e., the feedthrough plate 151, the feedthrough pins 102, 112, 122, 132*a-b*, 142, and the feedthrough pin insulators 104, 114, 124, 134*a-b*, 144) is designed to be vacuum tight. In this embodiment, the insulators 104, 114, 124, 134*a-b*, 144 may be brazed to respective feedthrough pins 102, 112, 122, 132*a-b*, 142 and the feedthrough plate 151 to provide a vacuum tight feedthrough assembly.

In benign applications the insulators 104, 114, 124, 134*a-b*, 144 work very well. In harsher applications, however, conductive material may coat or deposit on the feedthrough pins 102, 112, 122, 132*a-b*, 142 and insulators 104, 114, 124, 134*a-b*, 144. As a result, there can be electrical leakage between the feedthrough pins 102, 112, 122, 132*a-b*, 142 and the envelope 150 or feedthrough plate 151 of the vacuum gauge. For example, current may leak between the feedthrough pins 132*a-b* of the grid 131 and the feedthrough pins 102, 112, 122 of the cathodes 110, 120, allowing a current to flow through an emission control unit (not shown), which controls the current supplied to and emitted from the cathodes 110, 120. As a result, the above leakage current flowing through the emission control unit is spuriously measured as if it were the electron emission current traversing through space inside the ionization gauge from the cathodes 110, 120 to the grid 131. In one embodiment, the electron emission current may be 20 microamperes ($20\times10^{-6}$ amperes). Therefore, only 0.2 microamperes ($0.2\times10^{-6}$ amperes) of leakage current causes a one percent error. In some applications the electrical isolation may even be completely eliminated, causing the gauge to fail.

Of all the feedthrough pins, the ion collector electrode feedthrough pin 142 is the most sensitive to leakage currents because it measures single picoamperes ($1\times10^{-12}$ amperes) at the most extreme low pressures (or ultra-high vacuum). Therefore, even a small amount of leakage current can have a large impact on pressure measurements. Leakage current may develop in variety of ways. For example, leakage current may develop between the ion collector electrode feedthrough pin 142 and the feedthrough plate 151 to shunt ion current away from being measured. Leakage current may also develop between any cathode feedthrough pin (e.g., 102, 112, or 122) and any grid feedthrough pin (e.g., 132*a* or 132*b*) along a leakage current path that shunts current from the electron emission current in the measurement path. For example, leakage current may develop between feedthrough pins when a leakage current develops between the feedthrough pins and the feedthrough plate 151.

In general, there are two different groups of materials that may arrive at the feedthrough pin insulators 104, 114, 124, 134*a-b*, 144 to degrade or destroy electrical isolation of the feedthrough pins: (a) material sputtered from surfaces at or near ground (e.g., the ion collector electrodes 140*a-b*, the collector shield 147, and the gauge envelope 150 or anything metallic attached to it) and (b) gaseous material or products from a user's process occurring in a vacuum chamber that can be characterized as a cloud. The group (a) materials may travel in a line-of-sight from its source and group (b) materials may travel wherever they are able to travel. When the hot cathode ionization gauge is operated at pressures higher than that allowed for the gauge, such as above approximately 15 millitorr, the gas density in the gauge becomes dense enough for the gas molecules to scatter the formerly line-of-sight paths of sputtered atoms. Therefore, at higher pressures group (a) materials may travel in a manner similar to group (b) materials.

As described above, group (a) materials include materials removed or sputtered off from surfaces of the gauge that are at or near ground potential when ionized atoms and molecules impact these surfaces. For example, heavy ionized atoms and molecules, such as argon, from an ion implant process, may sputter off tungsten from a tungsten ion collector electrode and stainless steel from the collector shield 147. As the pressure of the process increases, there is an increase in the number of argon atoms per unit volume (density) and, as a result, more material from the ionization gauge surfaces is sputtered off. This sputtered material, such as tungsten and stainless steel, may then deposit on other surfaces of the ionization gauge that are in a line-of-sight, including the feedthrough pin insulators 104, 114, 124, 134*a-b*, 144. In this manner, the electrical isolation of the insulators is degraded and may eventually be destroyed.

Users do not want to stop their process to change gauges if they do not have to because that means down time, rework time, re-commission time, re-validate time, and so forth. Users prefer to change gauges at their convenience, for example, when they do their preventative maintenance work (e.g., the user changes the ionization gauge and starts over with a new ionization gauge having clean feedthrough pin insulators). Therefore, users desire an ionization gauge having a greater operational lifetime in harmful process environments.

In one embodiment, the feedthrough pin insulators 104, 114, 124, 134*a-b*, 144 may be heated to evaporate deposits from the surface of the feedthrough pin insulators 104, 114, 124, 134*a-b*, 144. However, depending upon the temperature required for the particular deposits, this method may harm the electronics due to the proximity of the electronics to the insulators 104, 114, 124, 134*a-b*, 144 and may compromise the hermetic or vacuum seals of the feedthrough pin insulators 104, 114, 124, 134*a-b*, 144 to the feedthrough pins 102, 112, 122, 132*a-b*, 142 and to the feedthrough plate 151. Moreover, this method may require additional feedthrough pins to provide a heating current to the insulators 104, 114, 124, 134*a-b*, 144. The additional feedthrough pins add to the problem of making the feedthrough assembly vacuum tight.

Figure 2:
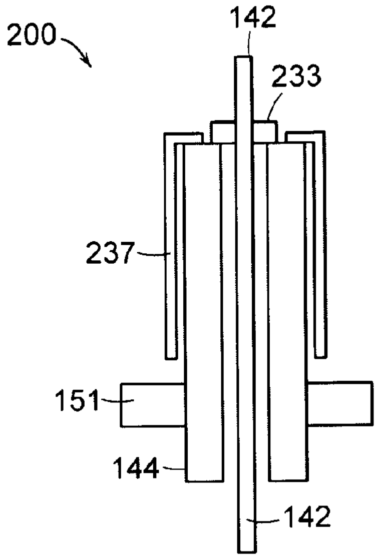
FIG. 2 is a cross-sectional view of a feedthrough pin assembly for a single feedthrough pin of the ionization gauge of FIG. 1 that includes an example feedthrough pin insulator shield according to one embodiment.

In other embodiments, an insulator shield may be employed to shield the feedthrough pin insulators 104, 114, 124, 134*a-b*, 144 from harmful deposits. FIG. 2 is a cross-sectional view of a feedthrough pin assembly 200 for the feedthrough pin 142 of FIG. 1 that includes an example insulator shield 237. As described above with reference to FIG. 1, the feedthrough pin insulator 144 electrically isolates the feedthrough pin 142 from the feedthrough plate 151. A metallic washer 233 may be welded to the feedthrough pin 142 and brazed to the insulator 144 to provide a vacuum seal. Also, the insulator 144 may be brazed to the feedthrough plate 151 to provide a vacuum seal. The example insulator shield 237 includes a top and sides to protect the feedthrough pin insulator 144 from process and sputtered material coming from various directions. The insulator shield 237 may be attached to the feedthrough pin 142, the feedthrough pin insulator 144, or the metallic washer 233.

The insulator shield 237 shields the feedthrough pin insulator 144 from most sputtered deposits since much of the feedthrough pin insulator 144 is up inside the insulator shield 237. Process gas deposits, however, may get around the insulator shield 237 by entering the space between the insulator shield 237 and the feedthrough plate 151. Therefore, in designing the insulator shield 237, a designer must carefully balance reducing the deposits that may reach the insulator 144 versus reducing the risk of electrical shorting due to a small distance between the insulator shield 237 and the feedthrough plate 151 coupled with irregularities in the uniformness of the insulator shield, and so forth.

Figure 3A:
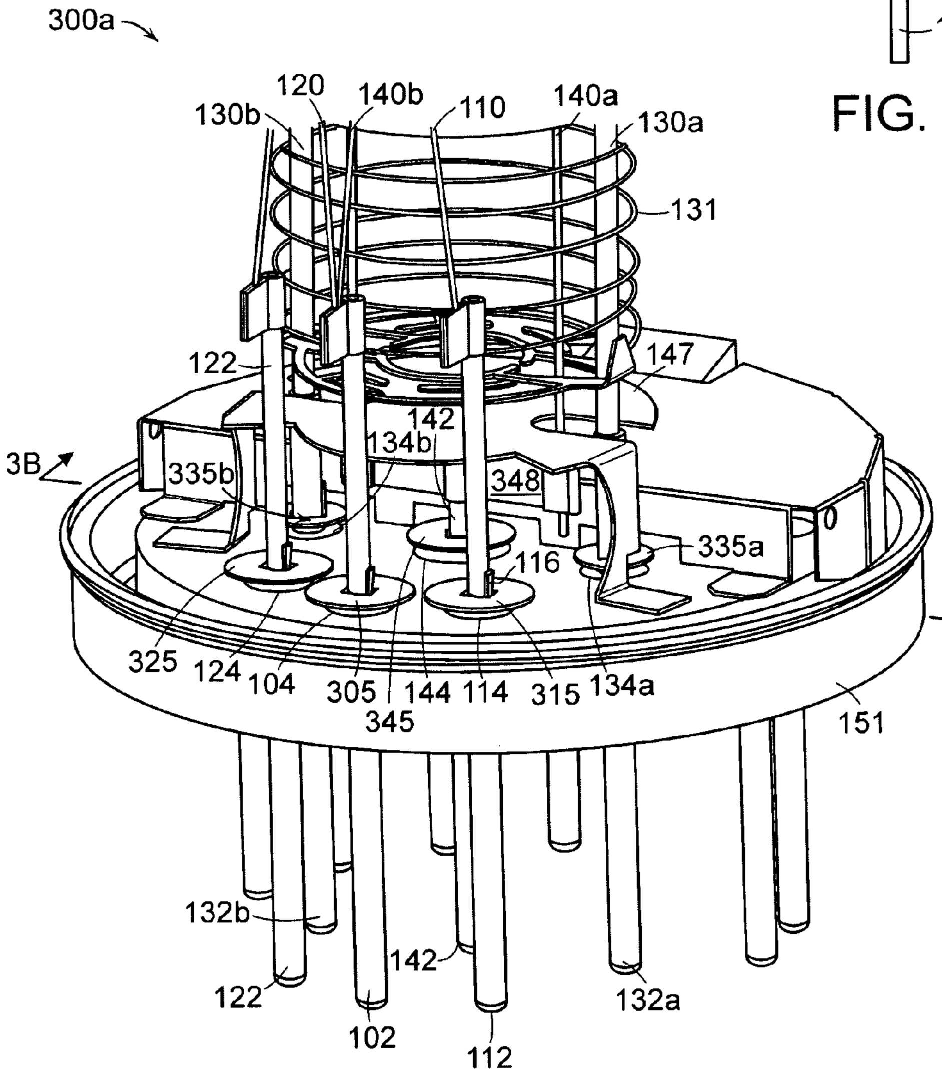
FIG. 3A is a perspective view of an example hot-cathode ionization gauge employing feedthrough pin insulator shields according to one embodiment.

FIG. 3A is a perspective view of an example hot-cathode ionization gauge 300*a* employing insulator shields 305, 315, 325, 335*a-b*, 345 according to one embodiment. As described above, electrically conductive material may sputter from gauge surfaces or may enter the gauge from a user's process and deposit on the insulators 104, 114, 124, 134*a-b*, 144. The insulator shields 305, 315, 325, 335*a-b*, 345 prevent the electrically conductive material from building up on the feedthrough pin insulators 104, 114, 124, 134*a-b*, 144 of the feedthrough pins 102, 112, 122, 132*a-b*, 142. As shown, the insulator shields 305, 315, 325, 335*a-b*, 345 may be placed near enough to the insulators 104, 114, 124, 134*a-b*, 144 to shield them from sputtered or process materials, such as electrically conductive materials.

Figure 3B:
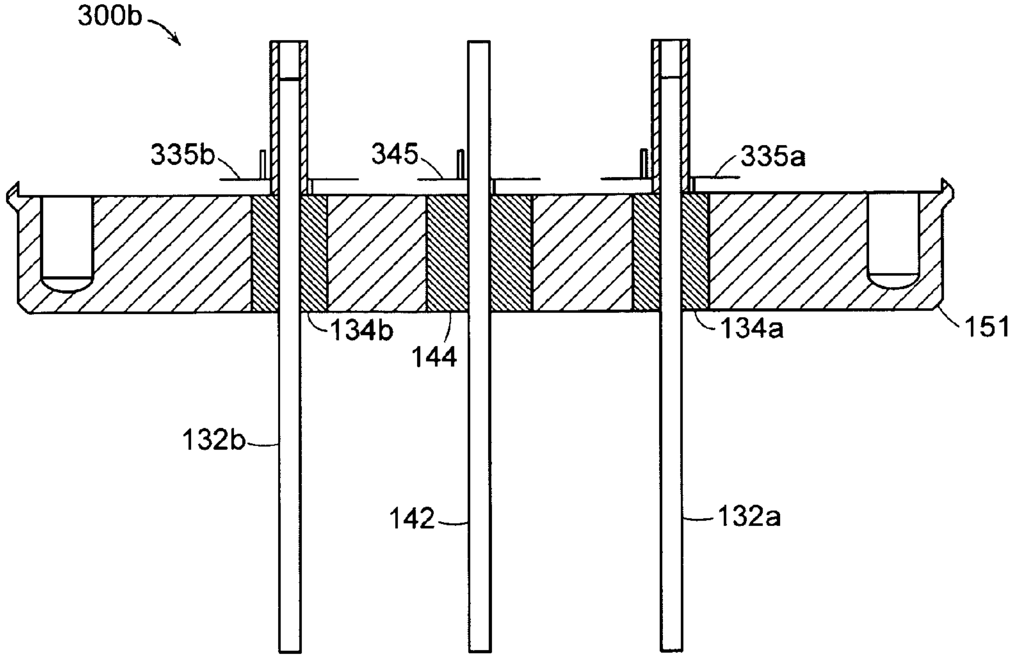
FIG. 3B is a cross-sectional view of a feedthrough pin assembly of the example hot-cathode ionization gauge of FIG. 3A.

FIG. 3B is a cross-sectional view of a feedthrough pin assembly 300*b* of the example hot-cathode ionization gauge 300*a* of FIG. 3A. As illustrated, insulators 134*a-b*, 144 insulate respective feedthrough pins 132*a-b*, 142 from the feedthrough plate 151. In this embodiment, a vacuum seal between the insulators 134*a-b*, 144 and the feedthrough plate 151 is formed according to a compression seal technique. According to this technique, openings are created in the feedthrough plate 151 in which to position the insulators 134*a-b*, 144 and respective feedthrough pins 132*a-b*, 142. The feedthrough plate 151 is then heated to cause it to expand and the insulators 134*a-b*, 144 and respective feedthrough pins 132*a-b*, 142 are positioned in the openings of the feedthrough plate 151. When the feedthrough plate 151 is cooled, the feedthrough plate 151 contracts and a compression seal is formed between the feedthrough plate 151 and the insulators 134*a-b*, 144. As illustrated, the feedthrough plate 151 completely surrounds the outer middle surface of the insulators 134*a-b*, 144, leaving the top and bottom surfaces exposed.

As described above, various deposits may collect on the insulators 134*a-b*, 144 and form an electrical path between respective feedthrough pins 132*a-b*, 142 and the feedthrough plate 151. According to one embodiment, planar insulator shields 335*a-b*, 345 are welded or otherwise attached to respective feedthrough pins 132*a-b*, 142 near enough to respective insulators 134*a-b*, 144 to shield them from the various deposits.

Figure 4:
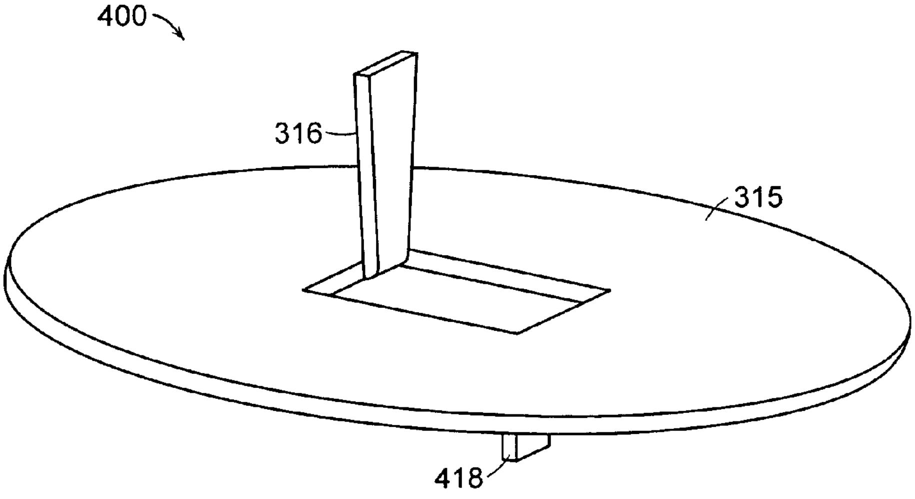
FIG. 4 is a perspective view of an example feedthrough pin insulator shield according to one embodiment.

FIG. 4 is a perspective view of an example insulator shield 400 according to one embodiment. The insulator shield 400 may include a shielding element 315, a tab 316 for attaching the insulator shield to a feedthrough pin, and a spacer 418 for providing a small distance between the shielding element 315 and a feedthrough pin insulator.

The example insulator shield 400 (or "skirt") is a low cost design that is easily assembled. According to one example method of assembling or manufacturing an ionization gauge, a feedthrough pin is first inserted through an aperture or opening in the insulator shield. The insulator shield is moved along the feedthrough pin until a spacer, protruding from the shield, comes into contact and rests against the feedthrough pin insulator. The spacer allows closer shielding of the feedthrough pin insulator without the possibility of the feedthrough pin shorting to the feedthrough plate. The insulator shield is then attached directly to the feedthrough pin. For example, a metallic insulator shield or a tab of a metallic insulator shield may be directly welded to a feedthrough pin. As a result, each skirt attains the voltage potential of each feedthrough pin. Also, each skirt may be configured to fit tightly around its feedthrough pin to eliminate deposits that may otherwise slip through gaps between the insulator shield and the feedthrough pin.

In embodiments of a single insulator shield for multiple feedthrough pins, the gap between the feedthrough pins and the insulator shield may be made narrow enough to reduce deposits that may otherwise slip through the gap, but large enough to avoid electrical contact. In other embodiments, the insulator shields may also attach to the feedthrough insulator or an envelope of the ionization gauge. In addition, the skirts may be adaptable to different geometries of ionization gauges.

In other embodiments, the insulator shield, which may be a ceramic shield, such as a ceramic washer, may be dropped over the feedthrough pins directly onto the feedthrough pin insulators. The ceramic washer may be retained at a given position by a keeper attached to the feedthrough pin. Electrically conductive deposits, however, may cover the ceramic washer and cause electrical shorting. A more complex shaped washer may be designed or a spacer may be used to prevent the electrical shorting.

Figure 5:
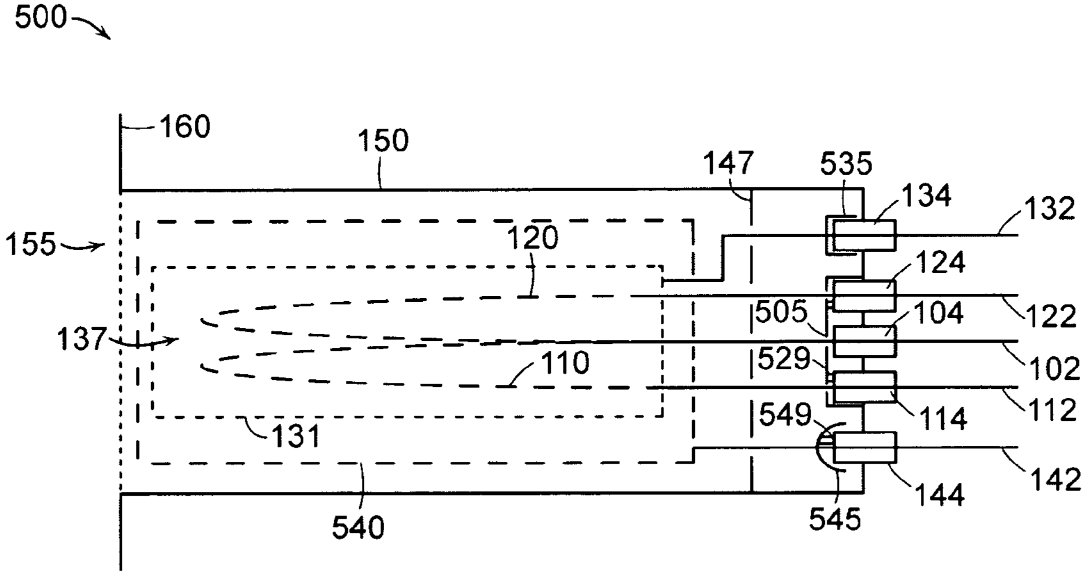
FIG. 5 is a diagram of an example hot-cathode ionization gauge according to another embodiment.

FIG. 5 is a cross-sectional view of an example non-nude triode gauge 500 employing varying embodiments of an insulator shield. The non-nude triode gauge 500 includes the two cathodes 110, 120, the anode 131 which may be configured as a cylindrical grid, a collector electrode 540 which may also be configured as a cylindrical grid, feedthrough pins 102, 112, 122, 132, 142, feedthrough pin insulators 104, 114, 124, 134, 144, the enclosure 150, and the flange 160 to attach the gauge 500 to a vacuum system. As with the ionization gauge illustrated in FIG. 1, the anode 131 defines an anode volume 137. Thus, the triode gauge 500 includes similar components and operates in a similar way as the standard B-A gauge described above with reference to FIG. 1, but the triode gauge's cathodes 110, 120 are located within the anode volume 137 and the triode gauge's collector 140 is located outside of the anode volume 137.

The example non-nude triode gauge 500 further includes various example insulator shield designs. A first insulator shield 535 includes a top and sides to shield both the top and a portion of the sides of the insulator 134. The first insulator shield 535 may be metallic and may be welded to the feedthrough pin 132 at the top of the first insulator shield 535.

A second insulator shield 505 also includes a top and sides. However, the second insulator shield 505 shields multiple insulators 104, 114, 124 and attaches to the envelope 150. As shown in FIG. 5, the second insulator shield 505 does not make contact with the feedthrough pins 102, 112, 122. The second insulator shield includes insulating spacers 529.

A third insulator shield 545 is similar to the first insulator shield 535 except that it has a hemispherical shape and includes a spacer 549.

As illustrated above, various embodiments of insulator shields may be employed. In one embodiment, a single large insulator shield may be employed for all or a portion of the region below the anode volume with cut-outs for electrode connections and/or feedthrough pins (e.g., insulator shield 505). In another embodiment, a small "skirt" is disposed close to each individual feedthrough pin (e.g., insulator shield 535). As illustrated in FIG. 5, a combination of the above embodiments may be employed on a single ionization gauge. For example, the insulator shield 505 may shield multiple insulators 104, 114, 124 and the insulator shield 535 may shield a single insulator 134. In other embodiments, multiple shields may be disposed one over the other to provide double shielding. For example, insulator shield 505 may be configured to further shield the insulator shield 535.

Embodiments of the insulator shields may either attach to a feedthrough pin or to the ionization gauge envelope. For example, as illustrated in FIG. 5, the insulator shield 505 attaches to the envelope 150 and the insulator shield 535 attaches to the feedthrough pin 132. Also, embodiments of the insulator shield may be made of either a metallic or insulating material.

In an embodiment in which a single insulator shield shields all feedthrough pin insulators, the single insulator shield may be attached to the feedthrough plate, which is at ground potential. For this embodiment, a large cut-out may have to be made in the shield plate for each of the feedthrough pins or other components because they are all operating at voltages with respect to ground and because of the location tolerance buildup for the various components (e.g., feedthrough pins). In some embodiments, the skirts may be preferable to the single shield plate because the large cut-outs may allow material to pass through to the insulators.

Figure 6:
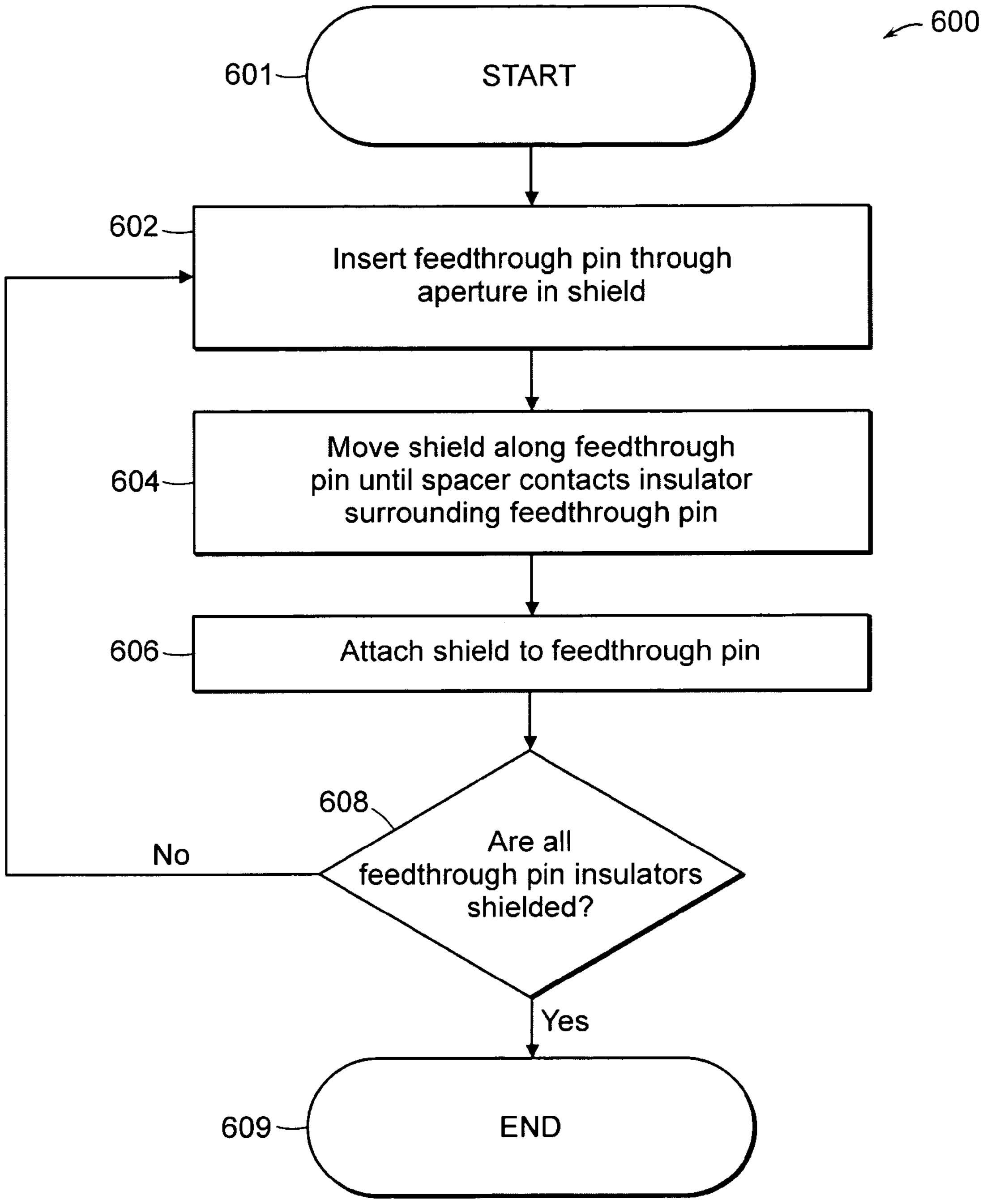
FIG. 6 is an example flow diagram illustrating a method of manufacturing an ionization gauge with a feedthrough pin insulator shield according to one embodiment.

FIG. 6 is an example flow diagram 600 illustrating a method of assembling an ionization gauge with an insulator shield according to one embodiment. After starting (601), a feedthrough pin is inserted through an aperture in a shield (602). The shield is moved along the feedthrough pin (604) until a spacer, protruding from the shield, contacts a feedthrough pin insulator surrounding the feedthrough pin. Finally, the shield is attached to the feedthrough pin (606). In other embodiments, the shield may be attached to the feedthrough pin insulator or an envelope of the ionization gauge. If another feedthrough pin insulator of the ionization gauge needs to be shielded (608), steps 602-606 of the flow diagram 600 are repeated. Otherwise, the flow diagram 600 ends (609).

While this invention has been particularly shown and described with references to preferred embodiments thereof, it will be understood by those skilled in the art that various changes in form and details may be made therein without departing from the scope of the invention encompassed by the appended claims.

In other embodiments, there may be two families of shielding, one for group (a) materials and one for group (b) materials. In one embodiment, there may be only one type of shielding for both groups of materials.

In yet other embodiments, a voltage potential may be applied to some insulator shields to shield and repel electrically charged deposits from the insulators. These insulator shields may be made of a conductive material. However, there must be adequate mechanical clearances between the feedthrough pins and insulator shields, but not so much as to allow deposits to pass through the mechanical clearances and deposit on the feedthrough insulators.

It should be understood that embodiments of the feedthrough pin insulator shields may by constructed in varying sizes and shapes of various materials or combinations of materials.

It should also be understood that more than two cathodes, more than one collector, and more than one anode of varying sizes and shapes may be employed in example ionization gauges according to other embodiments.

What is claimed is:

1. An ionization gauge, comprising:

an anode, an electron emitting cathode, and an ion collector electrode;

multiple feedthrough pins, including an individual feedthrough pin respectively coupled to each of the anode, the cathode, and the ion collector electrode;

an insulator coupled to and surrounding each electrical feedthrough pin;

a shielding object including an aperture adapted to receive each individual feedthrough pin, and the shielding object being configured to shield each individual feedthrough pin; and a spacer protruding from a first side of the shielding object adapted to provide a space between the shielding object and the insulator.

2. The ionization gauge of claim 1, further comprising:

a tab protruding from the shielding object adapted to be attached to an individual feedthrough pin.

3. The ionization gauge of claim 1, wherein the shielding object is a cylinder having a first end that is open and a second end that is closed, the second end including the aperture.

4. The ionization gauge of claim 1, wherein the shielding object comprises plural plates, each having an aperture to receive a respective feedthrough pin and each having a spacer.

5. The ionization gauge of claim 1, wherein the shielding object is made of an insulating material.

6. The ionization gauge of claim 5, wherein the insulating material is a ceramic material.

7. The ionization gauge of claim 5, wherein the insulating material is a glass material.

8. The ionization gauge of claim 1, wherein the shielding object is made of a conducting material.

9. The ionization gauge of claim 8, wherein the conducting material is a metallic material.

10. A method of manufacturing an ionization gauge, comprising:

providing an anode;

providing an electron emitting cathode;

providing an ion collector electrode;

respectively coupling multiple individual feedthrough pins to the anode, the cathode, and the ion collector electrode;

inserting the multiple individual feedthrough pins through respective apertures in a shielding object;

moving the shielding object along each individual feedthrough pin until a spacer, protruding from the shielding object, contacts a feedthrough pin insulator surrounding an individual feedthrough pin; and attaching the shielding object to an individual feedthrough pin, the feedthrough pin insulator, or an envelope of the ionization gauge.

11. The method of claim 10, wherein attaching the shielding object includes attaching a tab protruding from the shielding object to one of the multiple individual feedthrough pins.

12. The method of claim 11, wherein attaching the tab includes welding the tab to the feedthrough pin.

* * * * *